United States Patent [19]

Tanaka

[11] 3,972,893

[45] Aug. 3, 1976

[54] METHOD FOR PREPARING COBALT PHTHALOCYANINE COMPLEX SALTS

[75] Inventor: Toshiki Tanaka, Wakayama, Japan

[73] Assignee: Nippon Chemical Works Co., Ltd., Wakayama, Japan

[22] Filed: Mar. 12, 1975

[21] Appl. No.: 557,673

[30] Foreign Application Priority Data

Aug. 21, 1970 Japan.............................. 45-72781

[52] U.S. Cl. ............................................ 260/314.5
[51] Int. Cl.² ........................................ C09B 47/04
[58] Field of Search .................................. 260/314.5

[56] References Cited
UNITED STATES PATENTS 3,853,783   12/1974   Tucker............................ 260/314.5

Primary Examiner—Harry I. Moatz
Attorney, Agent, or Firm—Haseltine, Lake & Waters

[57] ABSTRACT

A method for preparing a cobalt phthalocyanine complex salt is described. More particularly, the invention pertains to a method for the advantageous preparation of a 6-valence cobalt phthalocyanine complex salt composed of a 6-valence cobalt phthalocyanine complex, in which an aliphatic polyamine has been coordinated at the two ligands not occupied by the phthalocyanine ring, and a mineral acid.

5 Claims, No Drawings

METHOD FOR PREPARING COBALT PHTHALOCYANINE COMPLEX SALTS

This invention relates to a method for preparing a cobalt phthalocyanine complex salt. More particularly, the invention pertains to a method for the advantageous preparation of a 6-valence cobalt phthalocyanine complex salt composed of a 6-valence cobalt phthalocyanine complex, in which an aliphatic polyamine has been coordinated at the two ligands not occupied by the phthalocyanine ring, and a mineral acid.

All the known methods for the production of such 6-valence cobalt phthalocyanine-amine complexes or complex salts have heretofore been conducted by the oxidation of cobalt phthalocyanine (refer to Yoshihira Bansho and Tatsuo Sekiguchi: the Japan Society for the Promotion of Science, 116-Committee Work Report, Vol. 18, 237, 1965; and Japanese Patent 600,236). However, the oxidizing agents used in said oxidation are poisonous and dangerous substances such as chlorine and nitric acid, and the solvents used therein are organic bases strong in odor such as pyridine and the like. Accordingly, the said methods cannot be said to be preferable even when viewed from the standpoint of prevention of environmental pollution.

With an aim to solve the above-mentioned problems derived from said oxidation and to develop a method capable of proceeding said production more safely and economically, I conducted extensive studies to establish a novel method for preparing 6-valence cobalt phthalocyanine-amine complex salts with marked advantages.

It is therefore an object of the present invention to provide a method for preparing a 6-valence cobalt phthalocyanine complex salt with ease by using phthalodinitrile as the starting material without using the cobalt phthalocyanine employed in the conventional methods.

It is well known that when condensed with a metal chloride in a polar solvent in the presence of a reducing material, phthalodinitrile converts through an unstable 6-valence phthalocyanine complex into phthalocyanine (refer to H.Z. Lecher, H.T. Lacay and J.P. Orem: J. Am. Chem. Soc., 1941, 63, 1326). It is also well known that when cobalt phthalocyanine is oxidized, various 6-valence cobalt complexes or complex salts are obtained, and that the said substances are unstable, in general, and hence are difficultly isolated in pure form, but certain relatively stable 6-valence cobalt phthalocyanine complexes are isolated, and, in this case, all the relatively stable substances are limited to those which have been colored to yellow or brown, while green-or purple-colored substances are quite unstable (refer to Yoshihira Bansho and Tatsuo Sekiguchi: the Japan Society for the Promotion of Science, 116-Committee Work Report, Vol. 18, 238, 1965, and Yoshihira Bansho and Tatsuo Sekiguchi: the Japan Society for the Promotion of Science, 116-Committee, First Subcommittee Research Examination Report, No. 104, 68, 1966).

Accordingly, even though a 6-valence cobalt phthalocyanine complex is desired to be obtained from phthalodinitrile by condensation, the condensation reaction does not terminate at a desired stage as far as the temperature condition (above 100°C.) necessary for said condensation reaction is used, but progresses to the stage of cobalt phthalocyanine quickly, with the result that no desired 6-valence cobalt phthalocyanine complex can be obtained smoothly and advantageously.

As will be understood from the above explanation, the reason why all the conventional methods for preparing 6-valence cobalt phthalocyanine complexes or complex salts have been limited to methods in which cobalt phthalocyanine is oxidized lies in that in the case of condensation reaction, there has not been found any such method as to smoothly control the reaction to a 6-valence cobalt phthalocyanine complex or complex salt and to effectively inhibit the subsequent reaction, i.e., the reaction to cobalt phthalocyanine.

By the establishment of the present method, I have been able to settle the above-mentioned point; namely, I have been able to produce 6-valence cobalt phthalocyanine complex salts in high yield and good purity directly from phthalodinitrile, without adoption of any such oxidation reaction as in the conventional methods.

Concretely, the present method is carried out in the manner described below.

A mixture comprising phthalodinitrile, a cobalt salt and a specified solvent is subjected to condensation reaction under a specified temperature condition in the presence or absence of urea, ammonium chloride or the like condensation aid, whereby the reaction proceeds gradually and the reaction mixture is converted into a viscous deep purplish blue-colored substance. In the reaction system, this purplish blue-colored substance is in a state precipitated from the solvent. On the other hand, an unconverted substance in a dissolved state exhibits a deep brown color, and decreases in amount with lapse of time to increase the amount of the purplish blue-colored substance. During this time, the progress of the reaction to cobalt phthalocyanine is completely inhibited. I paid attention to this inhibited state of the system which can be observed only in the case where the condensation reaction is conducted under specific conditions. No one has ever found such inhibited state. At the time when the brown color exhibited by the unconverted substance in the dissolved state has become extremely pale, hydrochloric acid is added to the reaction system to make the reaction system Congo Red acidic. In this case, the color of the reaction product turns from a purplish blue color to a dark green color. The thus obtained dark green substance is stable, and can be separated from the reaction system, washed with water and then dried. This substance is insoluble in methyl alcohol, slightly soluble in dimethylformamide at room temperature, and substantially dissolved in dimethylformamide at above 60°C. to exhibit a clear green color. In contrast, a 6-valence cobalt phthalocyanine, e.g., dichlorocobalt phthalocyanine having a deep brown color, which is obtained by the oxidation of cobalt phthalocyanine, is insoluble in hot dimethylformamide. The above-mentioned dark green substance is considered to be a 6-valence cobalt phthalocyanine complex composed of a plurality of components in which the decomposition or polymerization product of urea or like condensation aid used, the solvent used, and the acid radical of the mineral acid used, have been coordinated at the two ligands other than the four occupied by the cobalt phthalocyanine ring.

What is of quite importance is such a surprising fact that when the thus obtained dark green compound is reacted, either as it is or after separation from the condensation reaction system, with an aliphatic polyamine in the presence or absence of a solvent, there is easily obtained even at room temperature a simple 6-valence cobalt phthalocyanine complex salt, in which corresponding amines have been coordinated at the aforesaid two ligands. What is worthy of special mention here is that the dark green compound obtained in the aforesaid manner can completely react with amines at a far lower temperature than in the case of a 6-valence cobalt phthalocyanine complex obtained by oxidation of cobalt phthalocyanine. For example, the compound according to the present invention can completely react with 1-amino-3-dimethylaminopropane at room temperature (below 30°C.), whereas the aforesaid dichlorocobalt phthalocyanine cannot react therewith unless a high temperature of above 70°C. is employed. This is considered ascribable not only to such difference between the two in physical properties that the compound according to the present invention is not or slightly crystalline and soft whereas the compound obtained by oxidation is crystalline and hard, but also to the difference between the two in reactivity with amines. This low temperature reactivity with amines of the compound according to the present invention should be said to be an unexpected advantage for the present method in which the final product to be obtained should be high in purity and excellent in stability. This is because a 6-valence cobalt phthalocyanine complex salt is quite susceptible to temperature, in general, and easily undergoes decomposition or degradation with increasing temperature, which necessarily brings about such undesirable results that the final product is increased in amount of insolubles, lowered in concentration, and deteriorated in stability during storage or use.

Essential conditions required in practicing the present invention are such that phthalodinitrile is subjected to condensation reaction with a cobalt metal donor in a specified solvent under a specified temperature condition, and thereafter the resulting condensation reaction product is added with an aqueous mineral acid solution to form a stable 6-valence cobalt phthalocyanine complex, which is then reacted with an aliphatic polyamine.

The specified solvent referred to in the present invention is an alcohol having at least one hydroxyl group in the molecule, or a derivative thereof. In view of the reaction temperature, the use of a solvent having a boiling point of more than 100°C. is desirable. Examples of preferable alcohols are glycerin, ethylene glycol, polyethylene glycol, propylene glycol, polypropylene glycol, ethylene glycol, monoether and octyl alcohol or mixtures thereof. Even if the present invention is practiced by use of a solvent, e.g. ethylene glycol diethyl ether, other than the solvent specified in the present invention, the compound obtained in the condensation reaction step is already cobalt phthalocyanine, and even if this cobalt phthalocyanine is treated with an aqueous mineral acid solution and with an amine, no reaction takes place and thus the resulting substance is still cobalt phthalocyanine. The specified temperature referred to in the present invention is a temperature in the range of 100° to 150°C., preferably 115° to 135°C. Further, if the condensation reaction is effected at below the specified temperature, the reaction scarcely progresses even when carried out over a long period of tiem, while if the reaction is effected at above the specified temperature, the reaction to cobalt phthalocyanine cannot effectively be inhibited.

The cobalt salt used in the present invention is a cobalt salt such as, for example, cobalt chloride, cobalt nitrate or cobalt acetate.

The presence of urea or ammonium chloride is not an essential condition but is effective for acceleration of the condensation reaction rate. Furthermore, a part of urea acts also as a solvent. Even when used in a small amount, the said condensation aid shows the effect of promoting the reaction, and the effect does not change even if the condensation aid is used in a large amount. At below the temperature specified in the present invention, the reaction yield does not increase even when the reaction is carried out for two times the period required for the reaction, though the reaction to phthalocyanine is effectively inhibited. Examples of the condensation aid used in the present invention are urea, ammonium chloride, ammonium molybdate and the like ammonium salts, and boric acid.

As the mineral acid, there may be used hydrochloric acid, for example. In general, however, an aqueous solution containing 10 to 40% of a mineral acid is used. The required amount of the mineral acid is such an extent that the reaction mixture becomes Congo Red acidic, though the acid may be used in a larger amount. The temperature adopted in the mineral acid treatment is at least 50°C., preferably 70° to 100°C., while the time adopted in said treatment is 30 minutes to 2 hours.

The aliphatic polyamines suitably used in the present invention include ethylenediamine, propylenediamine, diethylaminoethylamine, dimethylaminopropylamine and diethylaminopropylamine.

The present invention is illustrated in detail below with reference to examples. It should be noted that all the specific disclosures given herein are not limitative, except for the solvents and temperature conditions specified above for the condensation reaction.

EXAMPLE 1

A mixture comprising 12.8 parts (by weight, the same shall apply hereinafter), 3.3 parts of anhydrous cobalt chloride, 6 parts of urea, 1.3 parts of ammonium chloride and 60 parts of ethylene glycol was added to a stirrer-equipped reactor of 200 parts in capacity, and was gradually heated up to 120°C. over a period of about 1 hour, whereby the reaction mixture gradually became viscous and separated into a liquid portion having a deep brown color and a precipitate portion having a purplish blue color. When the reaction was further continued for 3 hours at 130° to 135°C., the deep brown color of the liquid portion turned to a pale yellow color, the amount of the precipitates increased and the reaction mixture became more viscous and came to show a uniform deep purplish blue color. After confirming by filter paper spot test the fact that the color of the liquid portion had become pale, the inner temperature of the reactor was lowered to 80°C. and the reaction mixture was added with 27 parts of 30% hydrochloric acid and then stirred at 80° to 90°C. for 30 minutes, whereby the color of the reaction mixture turned to a dark green color and the liquid portion became substantially colorless. The reaction mixture was further stirred until the liquid portion became completely colorless. The time required therefor was about 1 hour. Thereafter, the temperature of the reaction mixture was lowered to below 10°C., and 80 parts of dimethylaminopropylamine was gradually added thereto.

Since the reaction is exothermic, the system is cooled, if necessary, so that the temperature does not increase to above 30°C. The terminal of the reaction can be confirmed by complete dissolution of the reaction mixture in an aqueous acetic acid solution.

After the reaction, the precipitates were separated by filtration and washed with water, and then the filter cake was dissolved at room temperature in 200 parts of 3% acetic acid. Subsequently, small quantities if insolubles were separated by filtration, and the filtrate was added with a 20% aqueous sodium chloride solution to deposit precipitates. The precipitates were recovered by filtration and then dried at 40°C. to obtain 13 parts of a greenish blue cobalt phthalocyanine complex salt. This complex salt was easily soluble in methanol or acetic acid-acidified water to exhibit a beautiful greenish blue color, but was insoluble in hydrocarbon solvents. The absorption maximum wavelength of the thus obtained product was 671 m$\mu$ as measured in a 2% acetic acid solution, and the elementary analysis thereof showed C 60.7%, H 5.22%, N 20.4%, Cl 6.46% and Co 7.15%.

EXAMPLE 2

A mixture comprising 12.8 parts of phthalodinitrile, 3.3 parts of anhydrous cobalt chloride, 15 parts of urea and 40 parts of ethylene glycol was stirred at 120° to 130°C. for 5 hours, and was then cooled to 90°C. Subsequently, the mixture was added with 30 parts of 35% hydrochloric acid and then stirred at 90° to 95°C. for 1 hour to deposit dark green precipitates. The precipitates were separated by filtration, washed with water and then dried at 60°C. 14 Parts of the resulted mass was dispersed in 100 parts of benzene, and the resulting dispersion was incorporated at below 30°C. with 8 parts of dimethylaminopropylamine and then stirred at room temperature for 1 hour to deposit precipitates. The deposited precipitates were recovered and dissolved in 500 parts of a 2% aqueous acetic acid solution. The resulting solution was subjected to filtration, and the filtrate was charged with aqueous ammonia to deposit precipitates, which were then recovered by filtration and dried at 50°C. to obtain 15 parts of a product. The absorption and elementary analysis values of the thus obtained product were identical with those of the product obtained in Example 1.

EXAMPLE 3

A mixture comprising 12.8 parts of phthalodinitrile, 3 parts of anhydrous cobalt chloride and 50 parts of ethylene glycol was stirred at 120° to 130°C. for 8 hours, and was then cooled to 90°C. Subsequently, the mixture was charged with 25 parts of 35% hydrochloric acid and then stirred at 90° to 95°C. for 1 hour to deposit dark green precipitates. The precipitates were separated by filtration, washed with water and then dried at 60°C. 12 Parts of the resultant was dispersed in 30 parts of chlorobenzene, and the resulting dispersion was incorporated at below 30°C. with 7 parts of dimethylaminopropylamine and then stirred at room temperature for 1 hour to deposit precipitates. The precipitates were recovered by filtration and dissolved in 500 parts of a 2% aqueous acetic acid solution. The resulting solution was incorporated with 1 part of active carbon and then subjected to filtration, and the filtrate was charged with aqueous ammonia to deposit precipitates, which were then separated by filtration and dried at 50°C. to obtain 12 parts of a product. The absorption and elementary analysis values of the thus obtained product were identical with those of the product obtained in Example 1.

EXAMPLE 4

A mixture comprising 12.8 parts of phthalodinitrile, 3.0 parts of anhydrous cobalt chloride, 5.0 parts of urea, 10 parts of ammonium chloride and 60 parts of glycerin was stirred at 115° to 120°C. for 4 hours, and was then cooled to 90°C. Subsequently, the mixture was charged with 35 parts of 30% hydrochloric acid and then stirred at 80° to 90°C. for 2 hours to deposit precipitates. The precipitates were separated by filtration and washed with water, and the resulting wet cake was gradually added at below 30°C. to 80 parts of ethylenediamine. The resulting mixture was stirred at room temperature for 1 hour to deposit precipitates, which were then recovered by filtration, thoroughly washed with water and dried at 50°C. to obtain 15 parts of a greenish blue powdery product. The absorption peaks of the thus obtained product as measured in a 2% acetic acid solution were 232 m$\mu$, 275 m$\mu$, 351 m$\mu$ and 677 m$\mu$.

What we claim is:

1. An improved method for preparing a 6-valence cobalt phthalocyanine complex salt composed of a 6-valence cobalt phthalocyanine complx, in which an aliphatic polyamine has been coordinated at the two ligands not occupied by the phthalocyanine ring, which comprises bringing phthalodinitrile and a cobalt salt into the condensation reaction in a saturated aliphatic alcohol solvent containing at least one hydroxyl group having a boiling point of above 100°C. at a reaction temperature of 100° to 150°C., to such an extent as to form a deep purplish blue-colored substance as a precipitate from the solvent, adding an aqueous inorganic or organic acid solution to the reaction mixture at a temperature greater than 50°C., until the reaction mixture becomes Congo Red acidic, and reacting said reaction mixture as such or after it has been separated by filtration with an aliphatic polyamine.

2. The method as claimed in claim 1, wherein said condensation reaction is carried out in the presence of a condensation aid selected from urea, ammonium chloride and mixtures thereof.

3. The method as claimed in claim 1, wherein said alcohol solvent is a member selected from glycerin, ethylene glycol, polyethylene glycol, propylene glycol, polypropylene glycol, ethylene glycol monoether, octyl alcohol and the mixtures thereof.

4. The method as claimed in claim 1, wherein the cobalt salt is cobalt chloride, cobalt nitrate or cobalt acetate.

5. The method as claimed in claim 1, wherein said aqueous acid solution is aqueous hydrochloric, nitric, sulfuric or acetic acid.

* * * * *